H. W. ISRAEL.
BACK MOTION CLUTCH FOR HOISTS.
APPLICATION FILED AUG. 4, 1908.
972,451.
Patented Oct. 11, 1910.
2 SHEETS—SHEET 1.
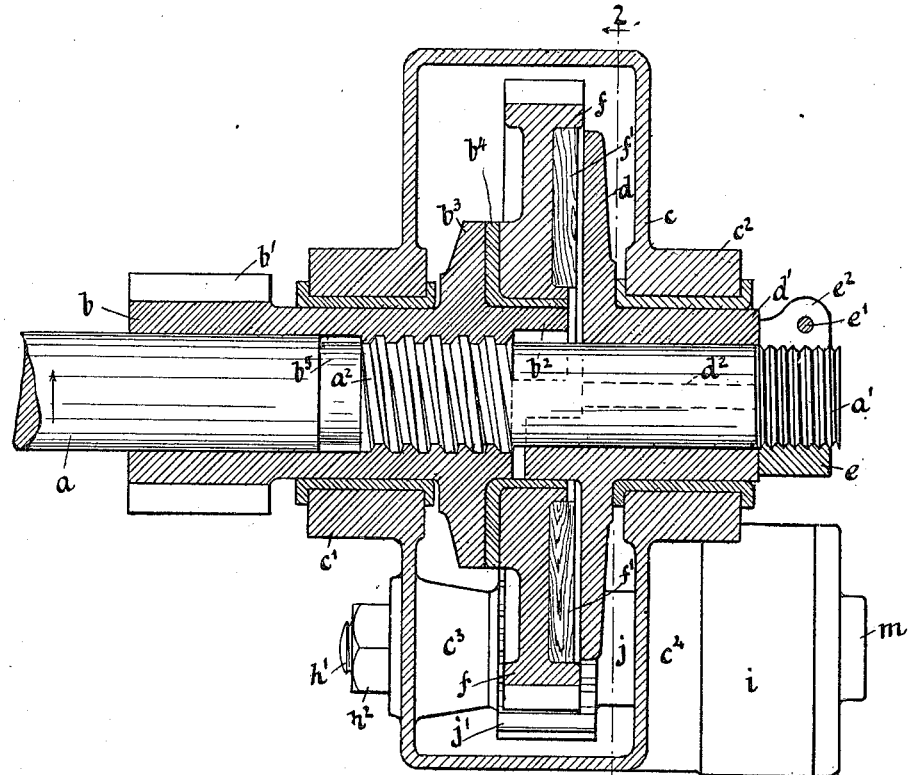
Fig. 1
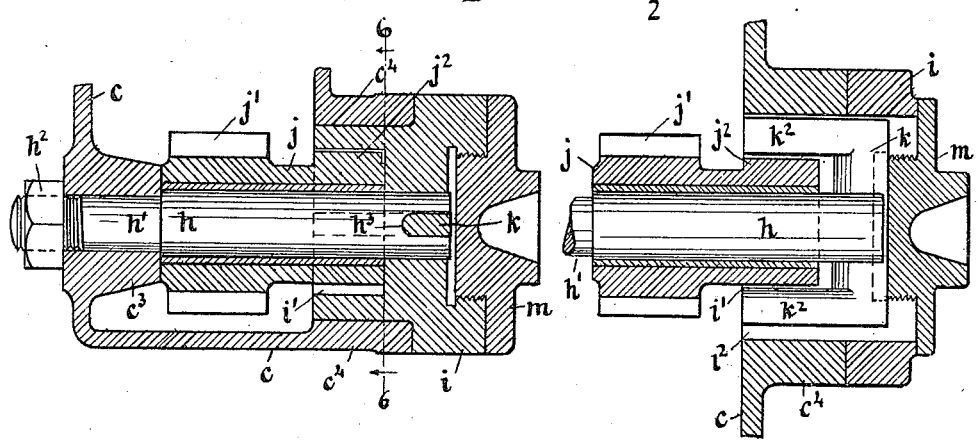
Fig. 3
Fig. 4
Witnesses
Geo. R. Hohman
Minnie D. Schienbein
Homer W. Israel, Inventor,
By George Wetmore Colles
Attorney

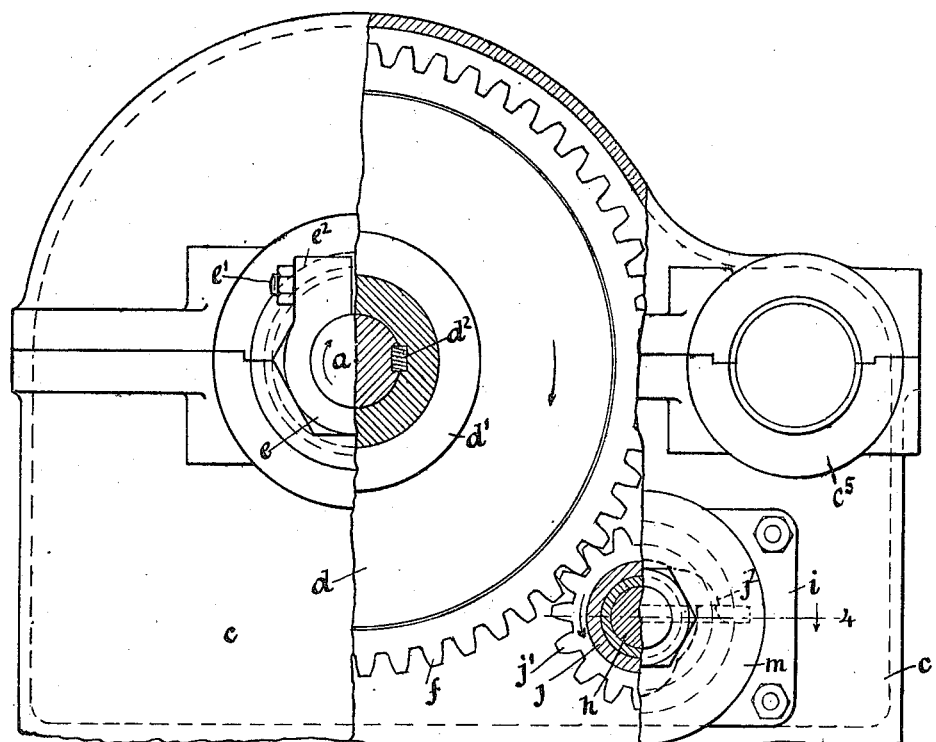

UNITED STATES PATENT OFFICE.

HOMER W. ISRAEL, OF WAUKESHA, WISCONSIN, ASSIGNOR TO MODERN STEEL STRUCTURAL COMPANY, A CORPORATION OF WISCONSIN.

BACK-MOTION CLUTCH FOR HOISTS.

972,451.    Specification of Letters Patent.    Patented Oct. 11, 1910.

Application filed August 4, 1908. Serial No. 446,989.

*To all whom it may concern:*

Be it known that I, HOMER W. ISRAEL, of Waukesha, Wisconsin, have invented a Back-Motion Clutch for Hoists, of which the following is a specification.

This invention consists of an improved form of device used in hoists for the purpose of taking the load off the driving motor or engine when not hoisting and acting as a brake when lowering.

The object of the invention is to improve such devices by providing a firmer and more mechanically correct method of holding the friction wheel against reverse motion while admitting free motion in the hoisting direction.

My invention consists, in general, in providing upon the sleeve of a pinion a series of external ratchet-teeth and a two-armed reciprocating pawl adapted to engage said ratchet-teeth first on one side and then on the other.

My invention further consists in the special constructions and combinations which will be hereinafter more particularly described and set forth in my claims.

The nature of my invention will best be understood from a consideration of the accompanying drawings, taken in connection with the following description thereof.

In these drawings, Figure 1 is a longitudinal section of a part of a hoisting-shaft having my improved form of clutch mounted thereon; Fig. 2 is an end view thereof partly in section on the plane 2; Fig. 3 is a longitudinal section on the plane 3 of the clutch-pinion and connected mechanism; Fig. 4 is a plan section of the same, taken on the plane 4; Fig. 5 is an end view of the same with the screw-cap removed; Fig. 6 is a transverse section of the same on the plane 6; and Fig. 7 is a perspective of the key or pawl.

In these drawings every like reference letter and numeral refers always to the same part.

In the drawings the main driving-shaft is designated $a$, and carries mounted thereon a pinion-sleeve $b$, which rotates in a bearing $c'$ formed on a casing $c$; said sleeve having pinion-teeth $b'$ formed thereon for driving a hoisting-drum; so that, in general, $a$ represents the driving and $b$ the driven element. The shaft $a$ is prolonged beyond the pinion $b$ to receive a clutch-disk $d$, whose hub $d'$ rotates in bearings $c^2$ on the casing $c$. This clutch-disk is fixed to the shaft $a$ against rotation by a key $d^2$ or any other suitable manner, and said disk is held against longitudinal displacement by a split screw-collar $e$ on the threaded end $a'$ of the shaft, which screw-collar may be drawn up tight to prevent displacement by means of a bolt $e'$ passing through the ears $e^2$ thereof.

The pinion-sleeve $b$ is provided with a journal $b^2$ and thrust-flange $b^3$ within the casing $c$, the active surfaces of which may be lined by a suitable bearing-metal lining $b^4$ to receive a gear-wheel $f$, which is rotatably mounted thereon and whose face opposed to the clutch-disk $d$ is lined with suitable frictional material (such as wood) $f'$. The driving connection between the shaft $a$ and pinion sleeve $b$ consists, in connection with the clutch mechanism, of interengaging screw-threads $a^2$, $b^5$, on the respective elements, which provide for a longitudinal movement of the sleeve $b$ upon the shaft, whereby the wheel $f$ is moved up against the clutch-disk $d$ or withdrawn therefrom.

At one side of the gear-wheel $f$ and within the casing $c$ is mounted a fixed shaft $h$, which is supported at one end in a boss $c^3$ on the casing and at the other by a block $i$ which fits within a boss $c^4$ on the other side of the casing. The shaft $h$ is reduced at $h'$ to fit within the boss $c^3$, and is threaded on its end to receive a nut $h^2$, thus securely clamping said shaft in place. The shaft $h$ carries rotatably mounted thereon a pinion-sleeve $j$, the gear-teeth $j'$ of which mesh with the teeth of the gear $f$, and said sleeve carries, in a recess $i''$ within the block $i$, a set of ratchet-teeth $j^2$ (herein shown as three in number) arranged equidistantly around its circumference. The block $i$ is provided with a transverse diametral slot $i^2$ extending on each side of the sleeve $j$ and receiving a two-armed pawl $k$ which reciprocates therein; the middle bar $k'$ of said pawl reciprocating further in a transverse slot $h^3$ in the end of said shaft $h$, and the two arms $k^2$ of said pawl being preferably chamfered off on opposite sides, whereby they give free passage to the teeth $j^2$ of the sleeve $j$ in a counterclockwise direction as shown in the drawings, but catch and hold them when said sleeve turns in a clockwise direction. The clockwise direction corresponds, as will be seen, to the direction of hoisting, and the counterclockwise direction to that of lowering, and the arms $k^2$ are so positioned that one of them always projects in the path of the teeth $j^2$, and therefore when hoisting said sleeve $j$ freely revolves and the pawl $k$ is moved from side to side by the teeth $j^2$, in order to allow them to pass first one arm and then the other. In lowering, on the contrary, the flat side of the teeth $j^2$ meets the flat side of the pawls $k^2$, consequently the sleeve $j$ is blocked and so also the gear-wheel $f$.

It will be seen from Fig. 1 that the direction of the screw-threads $a^2$, $b^5$ is such that in hoisting the pinion sleeve $b$ is thrust forward and the gear $f$ and clutch-disk $d$ brought together, whereby the gear $f$ is obliged to rotate, but as the sleeve $j$ is free to rotate in the hoisting direction the clutch will in this case be out of action. As soon however as the hoisting effort is removed from the shaft $a$, the load upon the pinion sleeve $b$ tending to rotate it in a reverse or clockwise direction will maintain the sleeve $b$ and gear $f$ in advanced or operative position, but such pull of the load is not effective to create a reverse movement since the sleeve $j$ is blocked to such movement. But if the motor be now applied to lower the load, that is to turn the shaft $a$ in the reverse direction, such movement will immediately withdraw the sleeve $b$ and gear $f$ from the disk $d$, thus permitting the shaft and sleeve to rotate free from the gear $f$, the latter now remaining stationary. Of course the reaction of the load is such as to create a certain amount of friction between the disk $d$ and gear $f$ sufficient to brake it and not permit the load to lower more rapidly than the speed of motor and the gear reductions.

The pawl $k$ and end of the shaft are preferably inclosed by a screw-cap or cover $m$ on the end of the block $i$.

The bearings $c^5$ shown upon the casing $c$ on the right of Fig. 2 are for the parallel shaft which carries the gear engaging the teeth $b'$, and is not herein shown as it forms no part of the present invention.

It should be observed that the pawl $k$ of my clutch is supported in a rigid block which can be made of any desirable size, and that there is no strain upon the supporting shaft $h$ other than that created by the engagement of the gear $f$ with the pinion teeth $j'$.

The invention as described is capable of various modifications, especially in the shape of the reciprocating pawl $k$, all of which lie within the scope of my invention so far as they are included within that of my claims.

Having thus described my invention, what I claim as new and desire to secure by Letters Patent is:

1. In a device of the class described, a fixed shaft, a sleeve mounted thereon and carrying ratchet-teeth, and a reciprocating pawl comprising a middle bar extending transversely across and beyond the end of the shaft and sleeve and two arms on the ends of said middle bar extending parallel to the axis of the shaft on opposite sides of said ratchet-teeth and in position to engage the same alternately, said pawl being reciprocated from side to side by said teeth as said sleeve rotates in one direction and being adapted to engage said teeth to prevent said sleeve from rotating in the other direction.

2. In a device of the class described, the combination of a fixed shaft, a fixed block supporting one end of said shaft, said shaft and block having each a diametral slot therein, a sleeve rotatably mounted on said shaft and carrying pinion-teeth and ratchet-teeth, said ratchet-teeth extending into a recess in said block, and a two-armed pawl whose middle bar extends through a slot in said shaft and whose end bars lie in the slot in said block and extend on opposite sides of said ratchet-teeth in a position to alternately engage the same, said pawl being reciprocated from side to side by the rotation of said sleeve in one direction, and engaging said teeth to prevent the rotation of said sleeve in the opposite direction.

In witness whereof, I have hereunto set my hand this 30th day of July, 1908.

HOMER W. ISRAEL.

Witnesses:
 W. CLAYTON LLOYD,
 G. W. HELMER.